RICHARD L. LEONARD
ROBERT P. ZUNDEL
INVENTORS

BY John R. Faulkner
Donald J. Harrington
ATTORNEYS

Jan. 3, 1967   R. L. LEONARD ET AL   3,295,387
MULTIPLE SPEED TRANSMISSION
Filed May 3, 1963   4 Sheets-Sheet 4

RICHARD L. LEONARD
ROBERT P. ZUNDEL
INVENTORS

BY
ATTORNEYS

United States Patent Office 3,295,387
Patented Jan. 3, 1967

3,295,387
MULTIPLE SPEED TRANSMISSION
Richard L. Leonard, Farmington, and Robert P. Zundel, Wayne, Mich., assignors to Ford Motor Company, Dearborn, Mich., a corporation of Delaware
Filed May 3, 1963, Ser. No. 277,855
17 Claims. (Cl. 74—472)

Our invention relates generally to multiple speed ratio power transmission mechanisms, and more particularly to a multiple speed ratio power transmission mechanism that is adapted especially to be used in the driveline of an automotive vehicle for transferring torque from the vehicle engine to the vehicle traction wheels.

A preferred embodiment of our improved transmission structure includes a hydrokinetic torque converter unit that is adapted to deliver multiplied engine torque through a turbine shaft to a planetary gear system having two simple planetary gear units. The relative motion of the elements of the planetary gear units is controlled by fluid pressure operated clutch and brake structure and an overrunning reaction brake to provide three forward driving speed ratios and a single reverse driving speed ratio.

The gear units and the associated torque delivery elements of their environment are arranged strategically to minimize the transverse dimensions of the mechanism without correspondingly reducing its torque transmitting capacity. The provision of such a transmission is one of the objects of our invention.

The clutches and brakes of our transmission mechanism may be engaged in pairs to establish each driving speed ratio. During operation in the highest speed ratio, the gear unit operates in a direct drive condition with both friction clutches applied. Only one of the clutches is applied, however, together with one of the brakes, during operation in each of the other ratios.

During operation in the lowest speed ratio, the reaction element of the gear units is anchored against a relatively stationary housing portion through an overrunning coupling. It merely is necessary then to engage an appropriate friction clutch to establish a driving connection between the turbine shaft and the driven shaft. A low speed drive condition can be established also, however, by engaging a friction brake for anchoring that same reaction member. This brake is supported by a stationary boss at the power output end of the assembly in such a way that reduced overall axial and radial dimensions may be maintained. The provision of a clutch and brake arrangement of this type is another object of our invention.

It is another object of our invention to provide a multiple speed ratio power transmission mechanism of the type above set forth wherein provision is made for reducing both the axial and radial dimensions of the unit without sacrificing torque transmitting capacity and for transmitting axial gear thrust forces and clutch and brake reaction forces to the transmission housing in a simplified fashion without over-stressing any of the structural components.

It is another object of our invention to provide such a transmission mechanism with a large degree of interchangeability of parts.

It is another object of our invention to provide a control system for controlling the application and release of the clutches and brakes of a transmission mechanism of the type set forth in the foregoing paragraphs to condition the transmission for operation automatically in any speed ratio that is required by the prevailing operating conditions.

It is another object of our invention to provide a control system for such a multiple speed power transmission mechanism wherein provision is made for maintaining an optimum control system pressure for initiating the application and the release of fluid pressure operated servos.

It is a further object of our invention to provide a control system for a multiple speed ratio power transmission mechanism wherein provision is made for accomplishing smooth speed ratio changes under torque without interrupting the torque delivery path.

In our improved transmission mechanism we contemplate that one of the two friction clutches will be applied continuously during operation in the forward driving speed ratios and that the other friction clutch will be applied during forward drive operation only in the high speed ratio. Intermediate speed ratio operation is accomplished by energizing a double acting fluid pressure operated brake servo which controls an intermediate speed ratio brake in sequence with the operation of the second clutch. A speed ratio downshift from the high speed ratio to the underdrive intermediate speed ratio may be obtained by disengaging the second clutch and applying the intermediate speed ratio brake. Conversely, an upshift from the intermediate speed ratio to the high speed ratio is accomplished by releasing the brake and engaging the second clutch in timed sequence.

It is an object of our invention to smooth the transition between these two ratios upon an upshift or a downshift by modifying the pressure that is made available to each servo. This modification occurs without reference to the operating pressure level that is maintained by the pressure regulator system. The optimum clutch and brake servo pressures may be influenced by control variables such as engine intake manifold pressure and vehicle speed, but the calibration of the system that is necessary to accomplish this is done independently of the calibration of the main regulator valve system.

It is a further object of our invention to provide a regulator valve circuit for use in a valve system of the type above described wherein provision is made for reducing the magnitude of the control circuit line pressure at high vehicle speeds relative to the pressure that is available at low vehicle speeds. We contemplate that this line pressure variation upon increasing vehicle speeds will occur after the torque ratio of the torque converter unit decreases from its maximum stall torque ratio to an intermediate value.

It is a further object of our invention to provide an improved valve mechanism for use in a system of the type above described wherein provision is made for selectively overruling the automatic action of the speed ratio changing valves by means of an appropriate adjustment of a manual valve. More than one forward driving range thus can be established.

It is a further object of our invention to provide a control system of the type above set forth wherein variations in engine vehicle manifold pressure are utilized both as a control signal for initiating responses of the main regulator valve and for establishing shift points during automatic speed ratio changes.

For the purpose of describing more particularly a preferred embodiment of our invention, reference will be made to the accompanying drawings, wherein:

FIGURE 2a is a view showing the manual valve of FIGURE 2;

FIGURE 3a shows a detail elevation view of the manual valve of FIGURE 3;

Figure 1:
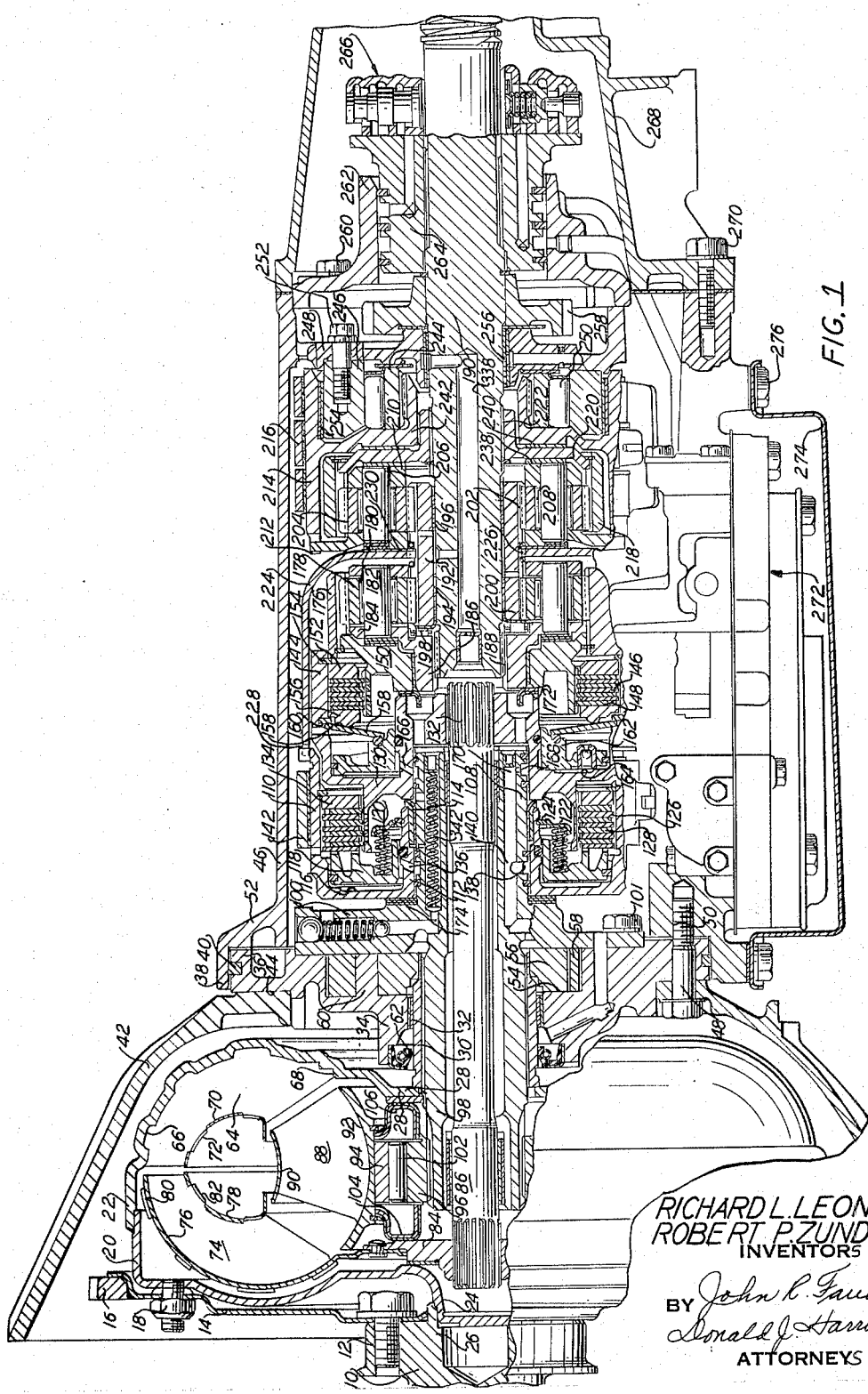
FIGURE 1 shows in cross sectional form an assembly view of the converter, the clutches, the brakes and the gear elements of our mechanism.

*Description of gear unit of FIGURE 1*

Referring first to FIGURE 1, reference numeral 10 designates generally a flanged power input shaft such as a crankshaft for an internal combustion vehicle engine. This power input shaft is bolted by means of bolts 12 to the hub of a drive plate 14. A starter ring gear for the vehicle engine is secured as shown at 16 to the periphery of drive plate 14.

The outer extremity of drive plate 14 is bolted by means of studs and cooperating nuts 18 to one part 20 of a torque converter drive shell. This part 20 is welded at its periphery to the outer periphery of a second impeller shell part 22. These impeller shell parts 20 and 22 thus form an integral impeller shell assembly. The hub of shell part 20 is formed with a pilot projection 24 which is received within a pilot opening 26 in the shaft 10.

The impeller shell part 22 is formed with a toroidal shape and its hub 28 is welded as shown to a supporting sleeve shaft 30. This sleeve shaft is journaled by means of a bushing 32 in an opening formed in pump housing 34. This housing 34 in turn extends radially outwardly and its periphery 36 is overlapped by a housing flange 38. The periphery of pump housing 36 is formed with an annular groove within which is situated a fluid seal 40.

Surrounding the impeller shell parts is a torque converter housing 42 that is bell shaped as indicated. The innermost periphery of bell shaped housing 42 is situated adajcent a shoulder 44 formed on pump housing 36. The outer periphery of housing 42 can be bolted to the vehicle engine block in a conventional fashion.

The housing 42, the pump housing 36 and the main housing 46 can be bolted together to form a unitary assembly by means of bolts 48. Aligned bolt openings are formed in housing 42 and in housing 36 to accommodate the bolts 48. Cooperating registering openings 50 are formed in a peripheral flange portion 52 of the housing 46 and are suitably threaded to receive the threaded bolts 48.

Pump housing 34 is formed with a positive displacement pump recess 54 within which are situated pumping elements 56 and 58. These pumping elements are eccentrically mounted in a conventional fashion, and the associated pump housing 34 is ported to establish a fluid pressure delivery system and a fluid pressure supply system. A crescent 60 is situated between the two pumping elements 56 and 58 in the usual fashion. Pumping element 56 can be in the form of a rotor with external teeth which mesh with internal teeth formed on pumping element 58.

Element 56 may be keyed to sleeve shaft 30 so that pump pressure will be developed whenever the vehicle engine is running.

A fluid seal 62 is provided as shown between the opening in housing 34 and the sleeve shaft 30.

Impeller shell part 22 has received therein a plurality of impeller blades 64, each of which has a plurality of projections 66 on its outermost periphery. These projections are received within cooperating slots formed in the inner surface of the toroidal shell part 22 and are held fast in this fashion. The impeller blades 64 can be inserted within the shell part 22 with the projections 66 first being received within their cooperating slots. Upon rotation of the blades 64 during assembly, the other projections, including innermost projections 68, can be brought into registry with their respective slots. The blade may be flexed to permit alignment of the projections with the slots.

The projections and the slots form the sole means for attaching the blades to the shell part 22. Additional support is provided by an inner shroud 70 which is apertured to receive tabs 72 formed on the inner periphery of each blade 64. Following assembly of the shroud 70, the tabs 72 are bent in a tangential direction thereby forming an integral impeller assembly that comprises the impeller shell, the blades, and the inner around 70.

Disposed in toroidal fluid flow relationship with respect to the impeller is a turbine which comprises a plurality of angularly spaced turbine blades 74. These blades define radial fluid flow passages which are defined in part by an outer shroud 76 and an inner shroud 78. Shroud 76 is apertured to receive tabs 80 formed on the outer periphery of each turbine blade. The inner periphery of each turbine blade is formed with tabs 82 which are received within a cooperating opening in shroud 78.

The hub of shroud 76 is riveted to a hub portion 84 that in turn is splined to a turbine shaft 86, the latter extending axially as indicated.

A reactor or stator is disposed between the flow exit section of the turbine and the flow entrance section of the impeller. The stator includes blades 88 situated between a first shroud 90 and a second shroud 92. The turbine, the impeller and the stator form a toroidal fluid flow circuit in the usual fashion. The shroud 92 of the stator is apertured to receive a cylindrical coupling race 94. An internally splined inner coupling race 96 is connected to an externally splined portion of stator shaft 98. The stator shaft is in the form of a sleeve that forms an extension of a wall portion 100. This wall portion is bolted by means of bolts 101 to the previously described pump housing 34.

Situated between the coupling races 94 and 96 is a series of rollers 102 which establish a one-way driving connection between the races. Race 94 may be cammed to establish a camming relationship between it and the rollers 102. Thrust members or spacers 104 and 106 are situated on either side of the coupling races to accommodate the transfer of torque between the hub 28 of the impeller shell part 22 and the hub portion 84 of the turbine.

Wall portion 100 is formed also with an extension 108. A drum 110, which includes a hub 112, is journaled upon extension 108 by means of a bushing 114.

Drum 110 defines in part an annular cylinder 116 within which is slidably situated an annular piston 118. This piston is urged normally in a left-hand direction as viewed in FIGURE 1 by means of clutch springs 120 which are anchored upon spring seat members 122. These members 122 are held axially fast upon the hub 112 by means of a snap ring 124.

The inner periphery of drum 109 is internally splined to establish a driving connection with externally splined clutch discs 126. These discs are situated in interdigital relationship with respect to internally splined clutch discs 128, thereby establishing a multiple disc clutch assembly. Discs 128 are carried by an externally splined clutch member 130 which in turn is splined to a shaft 86, a suitable splined connection 132 being provided for this purpose.

Drum 110 carries an externally splined back-up plate 134 which is held axially fast by means of a snap ring as indicated.

Piston 118 and cylinder 116 cooperate to define a fluid pressure chamber. Fluid may be admitted to this chamber through a radial passage 136 which communicates with an annular groove 138 formed in extension 108. Formed also in extension 108 is a pressure distributor passage 140 which communicates with a pressurized region of the automatic control valve circuit as will subsequently become apparent.

When fluid pressure is admitted to the clutch chamber through passage 140, piston 118 will compress the clutch discs thereby establishing a frictional driving connection between drum 110 and clutch member 130. A friction brake band 142 encircles drum 110 and is adapted to anchor the same selectively. This brake band is actuated by means of a double acting servo as will become apparent from a subsequent description of the automatic control valve system.

The clutch member 130 is formed also with a rearwardly extending portion 144 which is internally splined to establish a driving connection between member 130 and externally splined clutch discs 146. These discs 146 are situated in interdigital relationship with respect to clutch discs 148. These discs 148 are in turn internally splined to establish a driving connection with an externally splined clutch member 150. A clutch pressure back-up member 152 is splined or keyed to extension 144 and is held axially fast by means of a snap ring 154. A pressure plate 156 is situated adjacent the multiple disc clutch assembly and is engaged by an intermediate portion of a Belleville actuator spring 158. The outer periphery of the spring 158 is anchored as shown at 160 to the interior of the extension 144. The inner periphery of spring 158 is engaged by a radially inward portion of an annular piston 162.

An annular cylinder 164, which is defined by the clutch part 130, receives a piston 162. This piston and the cylinder cooperate to define a pressure chamber. Fluid may be supplied to this chamber through a passage 166 which in turn communicates with an annular groove 168. The groove 168 in turn communicates with a pressure supply passage 170 that forms a part of the automatic control valve system, as will become apparent subsequently.

At the point of engagement of the piston 162 with the inner periphery of spring 158 there is provided an annular round wire which establishes a pivotal action to reduce friction and binding between the spring 158 and the piston 162.

Upon application of clutch pressure to the annular cylinder 164, the resulting piston force will be multiplied by the leverage of the spring 158 to apply the multiple disc clutch assembly and establish a driving connection between member 130 and member 150.

A thrust washer 172 is provided between member 150 and member 130. Bushing 114 serves also as a thrust washer for the purpose of transferring thrust forces between hub 112 and member 130. Finally, a thrust washer 174 is provided between drum 110 and the adjacent wall 100.

Member 150 is externally splined to ring gear 176. This ring gear drivably engages a set of planet pinions 178 which are journaled by means of needle bearings 180 upon pinion shafts 182. These shafts are end supported upon a carrier which is identified by reference character 184. The carrier is formed with a hub 186 that is splined as shown at 188 to a driven shaft 190.

Journaled upon shaft 190 is a set of sun gears 192, suitably spaced bushings 194 and 196 being provided for this purpose. A thrust bearing 198 is situated between carrier hub 186 and the sun gears. These sun gears are identified separately by reference numerals 200 and 202. Sun gear 200 engages planet pinions 178. Sun gear 202 engages planet pinions 204 that are journaled upon pinion shafts 206 by means of needle bearings 208. These shafts 206 are carried by and form a part of a planet carrier 210.

Planet carrier 210 is connected at its outer periphery 212 to a brake drum 214 about which is positioned a multiple wrap brake band 216. This brake band can be applied and released by a fluid pressure operated servo as will be explained subsequently.

Planet pinions 204 engage also a ring gear 218 which is connected to a drive member 220. This member in turn is splined at 222 to the driven shaft 190.

A drive shell 224 encircles the clutch disc assembly 146 and 148 and the forward planetary gear unit as indicated. It is splined at its inner periphery 226 to the common sun gears 200 and 202.

Drive shell 224 is connected also by means of a key or other suitable connection 228 to the drum 110.

A thrust washer 230 is situated between carrier 210 and the drive shell 224. Another thrust washer 238 is situated between carrier 210 and the drive member 220. Still another thrust washer 240 is situated between drive member 220 and the web 242 of the brake drum 214.

The web 242 is formed with an externally splined hub which is connected to an internally splined brake race 244. An annular shoulder 246 is secured to an end wall 248 for the main transmission housing 46. This boss 246 forms an outer race that surrounds an inner race 244. Situated between these races is a series of brake rollers 250 which cooperate with cammed surfaces formed on boss 246. This boss 246 in turn can be bolted by means of bolts 252 to the wall 248.

The boss 246 functions also as a support for the brake drum 214. This support is formed by means of a bushing 254 which surrounds the boss 246.

The driven shaft 190 extends through an opening in the wall 248 and is journaled therein by means of a bushing 256.

A parking gear mechanism, shown in part at 258, is connected by means of splines to the shaft 190 on the outer side of the wall 248.

Connected by means of bolts 260 to the wall 248 is a fluid pressure distributor sleeve 262. Disposed within the sleeve 262 is a pressure distributor manifold 264 which is splined to the shaft 190 as indicated. Mounted adjacent the manifold 264 is a governor valve body 266. This valve body and its associated valve structure will be explained in a subsequent description of the control valve system.

Surrounding the governor body and the distributor manifold structure is a tailshaft housing 268 which is bolted to the housing 46 by bolts 270.

The control valve system is defined in part by a valve body identified generally by reference character 272. This valve body is located within a transmission sump that is defined in part by an oil pan 274 located at the lower portion of the transmission assembly. The oil pan is bolted to the housing 46 by bolts 276.

To establish low speed ratio operation, it merely is necessary to engage the rear clutch shown in part at 146 and 148. Turbine torque developed by the torque converter unit then is distributed through shaft 86 and through the engaged clutch to the ring gear 176. The common sun gears then will tend to rotate in a direction that is opposite to the direction of rotation of the shaft 86. The ring gear 218 resists this rotation since it is splined to the driven shaft 190. This tends to cause the carrier 210 to rotate under the resulting reaction torque, but this rotation is inhibited by an overrunning coupling shown in part at 250. The carrier 210 thus will serve as a reaction member for the combined gear units and a split torque delivery path is established. A portion of the power delivered initially to the ring gear 176 is distributed to shaft 190 through carrier 186. The balance of the power is distributed to the shaft 190 through the ring gear 218.

A so-called manual low speed drive condition is established by applying brake band 216 in addition to the rear clutch. A coasting condition then can be accommodated.

To establish intermediate speed ratio operation it merely is necessary to anchor the common sun gears. This is accomplished by engaging brake band 142. The common sun gears therefore act as a reaction member as the ring gear 176 continues to function as a power input member. The overrunning coupling shown in part at 250 will overrun under these conditions and the entire torque multiplication is accomplished by the forward gear unit.

To establish high speed ratio direct drive operation the brake band 142 is released and the clutch disc assembly shown in part at 126 and 128 is engaged. The rear clutch, of course, is engaged continuously during intermediate speed ratio operation and direct drive operation.

The gear unit thus becomes locked together for rotation in unison in a direct drive ratio.

To establish reverse drive operation brake band 216 is energized and the front clutch is applied. Unlike forward drive operation, the rear clutch is released. Brake band 216 is self-energizing during reverse drive operation so its capacity is greater during reverse drive than during low speed operation. Turbine torque then is distributed through the front clutch and through the drive shell 224 to the common sun gears. The carrier 210 will function as a reaction member since it is braked by brake band 216. This causes the ring gear 218 to rotate in a reverse direction and this reverse motion drives power output shaft 190 in a reverse direction relative to the direction of rotation of shaft 86.

Figure 2:
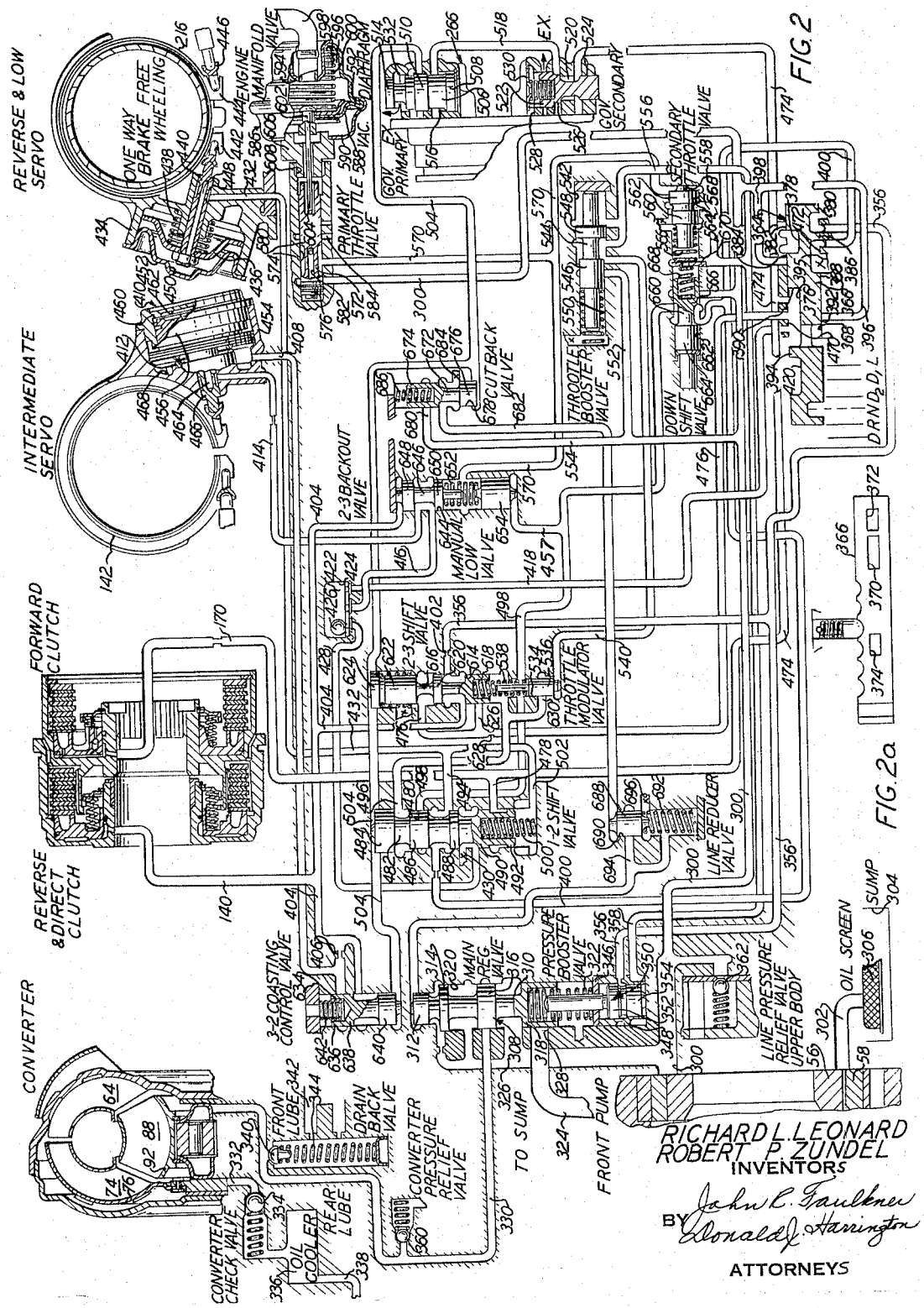
FIGURE 2 shows a control valve system capable of controlling the clutches and brakes of the structure of FIGURE 1.
Figure 3:
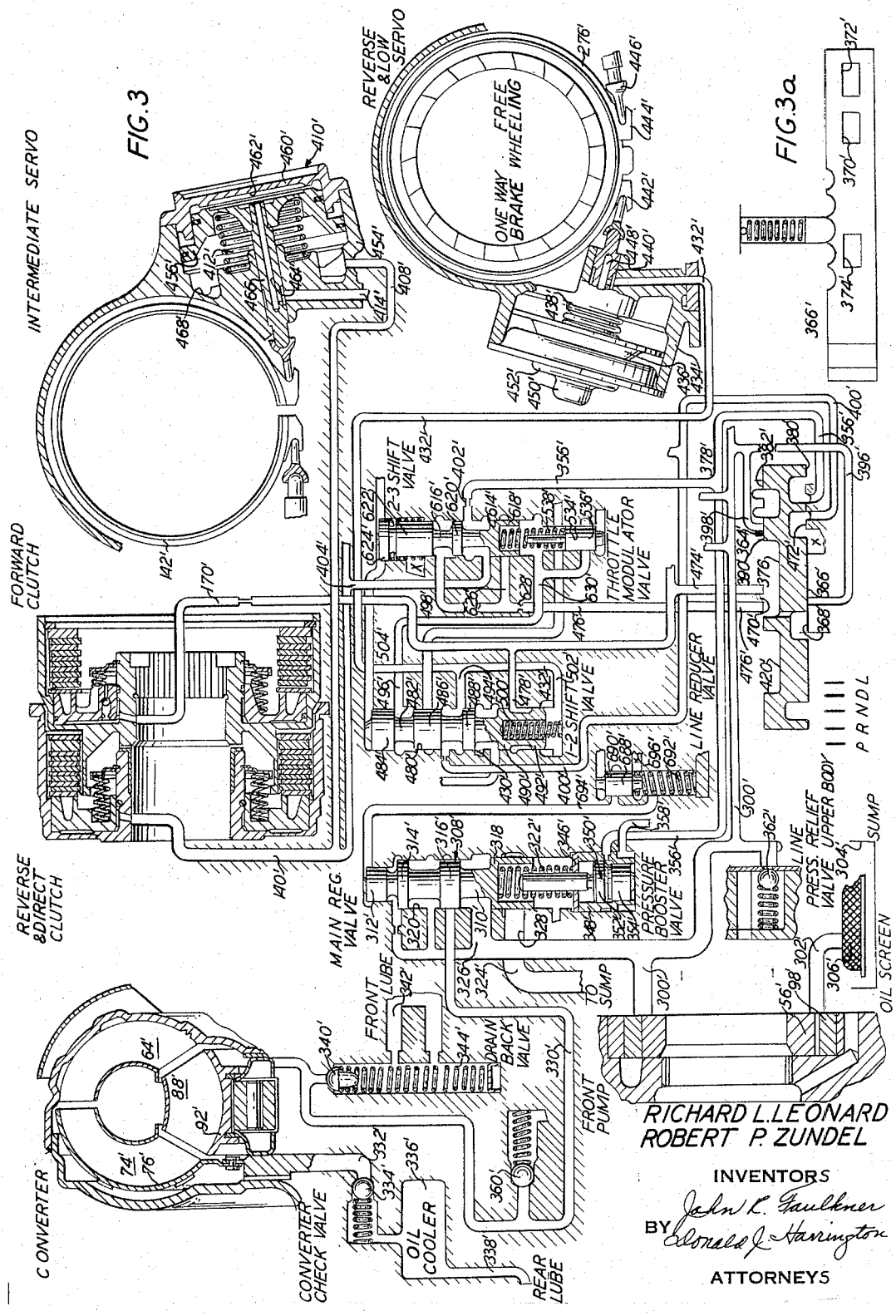
FIGURE 3 shows an automatic control system with a single forward drive operating range.

*Description of control circuit of FIGURES 2, 2a and 3*

Referring next to FIGURE 2, the front pump, which previously has been designated in part by reference characters 56 and 58, is adapted to supply fluid under pressure to a main line pressure passage 300. A fluid intake passage 302 communicates with an intake port for the front pump and supplies fluid to the front pump from an oil sump 304 within which is situated an oil screen 306. Sump 304 is defined in part by the oil pan 274 shown in FIGURE 1.

A main regulator valve is designated generally by reference character 308. It includes a valve spool 310 having spaced valve lands 312, 314, 316 and 318. Each of these valve lands cooperates with a corresponding internal valve land formed in a valve spool chamber 320.

Valve spool 310 is urged in an upward direction as viewed in FIGURE 2 by a valve spring 322.

Passage 300 communicates with the valve chamber 320 at a location intermediate valve lands 318 and 316. It communicates also with chamber 320 at a second location between valve lands 314 and 316 and at a third location between valve lands 312 and 314. The latter two valve lands are of differential diameter and the differential area defined thereby is subjected to the pressure in passage 300. The resulting force opposes and balances the spring force of spring 322 when the valve element assumes a regulating position.

A low pressure return passage 324 communicates with valve chamber 320 at a location adjacent high pressure intake port 326. When the main regulator valve assumes a regulating condition, valve land 318 uncovers low pressure port 328 communicating with passage 324. A controlled degree of by-pass then is established and the resulting pressure in passage 300 is maintained at a desered regulated value that depends upon the calibration of the main regulator valve.

During initial starting of the vehicle, pressure develops in the control circuit initially when the valve spool 310 is in an upward position. Under these circumstances, port 328 is blocked. As pressure begins to develop in the passage 300, however, land 316 uncovers a converter feed passage 330. This passage 330 is uncovered prior to the time port 328 is uncovered. Thus priority is given to the pressure requirements of this passage 330 before pressure is made available to the control circuit.

Converter feed passage 330 extends to the inlet side of the hydraulic torus circuit of the converter. The feed passage is defined in part by the annular space between the sleeve shaft 30 for the impeller and the stationary sleeve shaft 98 for the stator. This can best be observed by referring again to FIGURE 1.

The fluid then passes from this annular passage through the spacer 106 and into the intake side of the torque converter impeller passages. The fluid then circulates through the torus circuit and a portion of this flow is bled off through the gap between the outer turbine shroud 76 and the stator shroud 92.

A converter return flow passage 332 communicates with the flow exit portion of the torus circuit of the converter.

The return flow is directed through passage 332 and through a converter check valve 334 into an oil cooler 336. The fluid then passes from the oil cooler to a rearward lubricating circuit which is defined in part by the central lubricating oil passage 338 formed in power output shaft 190. Fluid may be distributed from this passage 338 to the various bearing elements through radial branch passages as indicated best in FIGURE 1.

Situated in parallel relationship with respect to converter feed passage 330 is a drain back valve 340. This valve establishes communication between passage 330 and a front lubrication oil circuit 342. Fluid is distributed from this circuit 342 to the various bearing elements through appropriate radial passages. A portion of passage 342 is formed in stationary extension 108 as indicated in FIGURE 1.

The drain back valve is lightly loaded by means of a spring 344. It is adapted to become unseated when the pressure in passage 330 reaches a value of approximately 5 p.s.i. When the vehicle engine is stopped following driving operation, the control circuit pressure of course will decrease to zero. The drain back valve, however, will establish a so-called fluid lock in the torus circuit of the hydrokinetic torque converter thereby allowing the torque converter circuit to remain filled. It thus is conditioned for immediate operation upon restarting the engine. The fluid in the torque converter will not drain past the drain back valve into the lub circuit by reason of the spring pressure that is applied to the valve.

Located at the base of the main regulator valve is a spring plate 346. It is held in a fixed position against an internal valve shoulder by means of a cylindrical insert 348. Disposed within this insert 348 is a shuttle valve piston 350 which is identified in FIGURE 1 as a pressure booster valve. This valve is formed with spaced valve lands 352 and 354 which define a differential area. Control pressure can be distributed to this differential area through a passage 356. This passage 356 is pressurized during reverse drive operation for the purpose of augmenting the operating pressure level of the main regulator valve.

The lower end of valve land 354 is pressurized with secondary throttle pressure through a passage 358. The variations in the magnitude of this pressure then cause corresponding variations in the magnitude of the main regulator valve output pressure.

A converter pressure relief valve 360, which is located in passage 330, prevents an excessive supercharge of the torque converter circuit. It is designed to become uncovered when the magnitude of the torque converter circuit pressure reaches a value of approximately 70 p.s.i.

The converter check valve 334 will permit a pressure to develop in the torque converter circuit during operation. This pressure develops in advance of the build-up in the pressure in the control system as explained previously. The converter check valve also prevents draining of the fluid in the torus circuit of the converter through the cooler and through the rear lubrication oil circuit when the vehicle is not in use. In this respect the function of the converter check valve is similar to the function of the drain back valve.

For purposes of safety, a line pressure relief valve 362 is situated in communication with passage 300 It maintains a seal under the influence of spring pressure, however, until a back-pressure of 275 p.s.i. is achieved. It normally is inoperative and assumes a closed position during normal operation of the control system A manual valve is designated generally by reference character 364. It includes a sintered metal valve element 366 situated within a cylindrical valve chamber 368. This valve element 366 is illustrated also in FIGURE 2a where it is shown in a position 90° out of phase with respect to the position shown in FIGURE 2

As indicated in FIGURE 2a, valve element 366 includes a first cavity 370, a second cavity 372 and a third cavity 374. Unlike cavities 370 and 372, the cavity 374 extends through the valve and it establishes communication with another cavity 376 located 180° out of phase with respect to it.

Still another valve cavity 378 is situated opposite cavities 370 and 372 but 180° out of phase with respect to them.

The manual valve element 366 can be shifted to any one of several operating positions. Each position is indicated in FIGURE 2 by a reference legend. The various legends, identified as P, R, N, D2, D1, and L, respectively, identify the park position, reverse position, neutral position, second drive range position, first drive range position and the low speed ratio or manual low driving position. Valve element 366 can be adjusted as desired by a suitable driver operable mechanical linkage in the usual fashion.

The recesses in the manual valve element 366 define a plurality of valve lands that are identified separately by reference characters 380, 382, 384, 386, 388, 390, 392 and 394.

An exhaust port communicates with valve chamber 366 as shown at 395.

The manual valve element is indicated in the neutral position in FIGURE 2. When it assumes this position, valve land 392 blocks passage 396 which in turn communicates with line pressure passage 300. Also, land 384 blocks passage 398 which also communicates with line pressure 300. Under these conditions pressure distribution to the valve system is interrupted.

When the manual valve element 366 is shifted to the reverse position R, land 380 interrupts communication between passage 356 and the exhaust opening at the right hand end of the manual valve chamber. Land 384 uncovers passage 398. Land 386 moves across another passage 400 and interrupts communication between that passage and the exhaust port 395. Under these conditions control pressure is distributed from passage 398 to the recess 378. This pressure then passes from recess 378 to passage 400 through the annulus at the location where passage 400 communicates with valve chamber 368. Line pressure then passes from this passage 400 through the recess 372 to the passage 356. Pressure then is distributed to the differential area defined by valve lands 354 and 352 on the pressure booster valve. The resulting pressure force supplements the force applied to the regulator valve spool 310 by the spring 322, and a higher line pressure then is made available to the valve system. This increases the capacity of the reverse clutch and the reverse brake servo.

When passage 356 is pressurized in this fashion, pressure is distributed across an orifice 402 located in passage 356 and through the 2-3 shift valve to passage 404. This passage in turn communicates directly with passage 140 which extends to the reverse and direct front clutch pressure chamber as explained previously. Pressure is distributed also from passage 404 through an orifice 406 which establishes communication between passage 404 and a passage 408 extending to the release side of an intermediate brake servo identified generally by reference character 410. This servo, however, normally assumes a released condition during reverse drive operation by reason of the action of servo spring 412. The introduction of pressure to the release side of the servo then simply augments the action of the spring 412.

The apply side of the intermediate servo is exhausted through a passage 414 which in turn communicates with a passage 416 through a 2-3 back-out valve. This passage 416 is exhausted through passage 418 which in turn communicates with an exhaust region through a cavity 420 formed in the manual valve element 366.

Communication between passage 416 and 418 is established by a three position check valve 422. This valve comprises a valve chamber 424 and three ports communicate with this valve chamber as indicated. A shiftable ball valve element 426 is located in chamber 424 and is adapted to register with any one of three ports. One of these three ports communicates with passage 418 as indicated and a second of these ports communicates with passage 416. A third port communicates with a passage 428, which in turn extends to the 1-2 shift valve, and is exhausted through an exhaust port 430.

Passage 400, as previously explained, also is pressurized during reverse drive operation. This passage communicates with a passage 432 through the 1-2 shift valve as indicated. Passage 432 in turn extends directly to the apply side of the reverse and low brake servo. It will be apparent therefore that the front clutch and the rear servo are both applied simultaneously. As explained previously, this establishes reverse drive operation.

The reverse and low servo comprises a cylinder 434 which is formed by a portion of the transmission housing. Slidably situated within this cylinder is a piston 436 which is urged in a left hand direction as viewed in FIGURE 2 by a servo spring 438. Piston 436 is connected by a threaded bolt to a piston stem 440 that is slidably received within a cooperating bore in the housing portion of which cylinder 434 forms a part. The extended end of stem 440 engages one end 442 of the brake band 216. The other end 444 of the brake band 216 is anchored by a suitable adjustable anchor member 446 that is connected in turn to the transmission housing.

Brake band 216 preferably is of the multiple wrap type so that it is self-energizing when the transmission is operated in the reverse drive range and during coasting. It is not self-energized, however, during operation under torque in the manual low drive range.

Stem 440 is formed with passage 448 which communicates with a pressure chamber 450 formed on one side of the piston 436. This chamber 450 is defined in part by a closure plate 452 secured to the cylinder 434. Passage 448 communicates with passage 432 through a suitable radial port which is enlongated to establish communication between passage 432 and chamber 450 regardless of the position of the piston stem.

The intermediate brake servo comprises a servo cylinder 454 which may form a part of the transsmision housing. Situated within this cylinder 454 is a shiftable piston 456. This piston is urged normally in a right hand direction, as viewed in FIGURE 2 by the servo spring 412.

A closure member 460 cooperates with piston 456 to define a pressure chamber 462. This chamber 462 communicates with passage 414 through an opening 464 formed in the piston stem 466. This stem is slidably received within a cooperating bore formed in a portion of the transmission housing. Communication between passage 464 and passage 414 is established by means of an enlongated radial port.

The piston 456 cooperates also with the cylinder 454 to define a pressure release chamber 468 in the region of the spring 412. This chamber 468 communicates with passage 408 as indicated previously.

The effective area of chamber 468 is greater than the effective area of chamber 462 by reason of the stepped diameter of the piston 456. Thus when both chambers 468 and 462 are pressurized simultaneously, the brake servo will assume a release position.

If it is assumed that the manual valve element 366 is shifted to the D1 position, valve land 390 will uncover passage 398. Also valve land 394 will register with internal valve land 470 in the valve chamber 368. In a similar fashion valve land 388 will register with internal valve land 472. Passage 356 will be exhausted through the manual valve and through the exhaust opening at the right hand end of the manual valve chamber. Passage 400 likewise will be exhausted through that same exhaust flow path by reason of the communication established between the exhaust region and the passage 400 by recess 370 in the manual valve element 366.

Recess 376 in the manual valve element will establish communication between pasage 398 and passage 474 and 476. Passage 418 on the other hand will be exhausted through the left hand end of the manual valve chamber.

Passage 474 distributes control pressure directly to the forward drive clutch servo by reason of the communication between it and the servo feed passage 170. Passage 474 communicates also with a branch passage 478 that communicates with the 1–2 shift valve chamber 480.

Situated within the 1–2 shift valve chamber is a multiple land valve spool 482 having spaced valve lands 484, 486, 488, 490 and 492. Valve land 490 is slightly larger than valve land 492 so that the pressure in passage 478 will establish a force on the valve element 482 which acts in an upward direction as viewed in FIGURE 2.

Passage 428, described previously, communicates with valve chamber 480 at a location adjacent valve land 490. It is exhausted, of course, through exhaust port 430 when the valve element 482 assumes the position shown in FIGURE 2. Passage 432 communicates with the shift valve chamber 480 through a branch passage 494 at a location adjacent valve land 488. When the valve element 482 assumes the position shown, direct communication is established between passages 400 and 494 through a flow restricting orifice.

A modulated throttle pressure passage 496 communicates with the shift valve chamber between lands 484 and 486. Land 484 is larger than the land 486 so that the pressure distributed through passage 496 will establish a pressure force which acts in an upward direction.

A forced down-shift or kick-down pressure passage 498 communicates also with the shift valve chamber 480 at a location adjacent valve land 486. This land blocks passage 498 when the valve element 482 assumes the position shown in FIGURE 2. Passage 498 communicates with the region between the valve lands 484 and 486, however, when the valve element 482 assumes a downward position corresponding to the upshifted condition of the valve.

Valve element 482 is urged normally in an upward direction by a valve spring 500. Rear brake servo pressure is distributed to the valve chamber in the region of the spring 500 through a branch passage 502 which communicates with passage 432.

It will be apparent therefore that as soon as the manual valve is moved to the D1 position, pressure will be made available immediately to the forward drive clutch. The other clutch and each of the brake servos, however, are de-energized. The transmission then is conditioned for forward drive operation and the driving torque reaction of the gear unit is accommodated by the overrunning coupling shown in part in FIGURE 1 at 250.

Acting upon the upper end of the 1–2 shift valve land 484 is a vehicle speed governor pressure signal which is distributed to the 1–2 shift valve through a governor pressure passage 504. This passage 504 extends to the primary governor valve which forms a part of the governor valve assembly 266. This primary governor valve comprises a multiple land valve spool 506 having multiple lands 508, 510 and 514. Land 508 is of greater diameter than the diameter of valve land 510. The valve spool 506 is situated within a governor valve chamber 516 which communicates with a passage 518. This passage 518 extends to a valve chamber 520 within which is situated a secondary valve element 522. This valve element is formed with valve lands 524 and 526, the diamter of the latter being greater than the diameter of the former. An exhaust port communicates with the chamber 520 as shown at 528.

Communicating also with the valve chamber 520 is the previously described passage 474.

The pressure made available to the secondary governor valve element acts upon the differential area formed by valve lands 524 and 526 and urges the valve element 524 radially inwardly.

At the same time the degree of communication between passage 518 and exhaust port 528 is reduced. The modulated pressure then established acts upon the differential area defined by valve lands 508 and 510 thereby urging the valve element 506 in a radially inward direction. When it assumes the innermost position, the valve element 506 will block passage 504 and interrupt communication between passage 504 and passage 518.

The magnitude of the pressure in passage 518 is an indicator of the driven speed of the power output shaft. At lower vehicle speeds, however, this pressure is not distributed to passage 504. Instead, passage 504 is exhausted through an exhaust port 532 that communicates with a valve chamber 516.

When a predetermined vehicle speed is reached, the centrifugal force acting upon valve element 506 will urge the latter in a radially outward direction against the opposing force of the modulated pressure in passage 518. The centrifugal force acting upon the valve element 522, the pressure force and the spring force of spring 530 produce a resultant modulated pressure in passage 518 that then will be delivered to passage 504 at higher vehicle speeds. This pressure acts upon the upper end of valve element 484 of the 1–2 shift valve, as indicated previously.

Modulated throttle pressure passage 496 communicates with a throttle modulator valve chamber 534 located at one end of the 2–3 shift valve. Slidably situated within chamber 534 is a throttle modulator valve element 536 which is urged in a downward direction as viewed in FIGURE 2 by a valve spring 538. This valve spring is disposed between valve element 536 and the 2–3 shift valve as indicated.

The lower end of the valve element 536 communicates with a throttle booster valve passage 540 which in turn communicates with a throttle booster valve chamber 542 within which is slidably situated a booster valve element 544. Valve lands 546 and 548 are formed on valve element 544, the diameter of the latter being greater than the diameter of the former. A spring 550 normally urges the valve element 544 in a right-hand direction, as indicated.

Line pressure is distributed to the valve chamber 542 through branch passages 552 and 554 which communicate with the passage 300. Passage 552 normally is blocked, however, by land 546.

Secondary throttle valve pressure is distributed to chamber 542 through a passage 556. Branch portions of this passage 556 communicate directly with the right-hand side of land 548 and with the region between valve lands 548 and 546. As secondary throttle valve pressure increases in magnitude, the spring 550 will begin to yield. Land 548 then will progressively decrease communication between passage 556 and passage 540, and at the same time communication between passage 552 and passage 540 is progressively increased by reason of the action of valve land 546. Initially, direct communication is established between passage 556 and passage 540. When the magnitude of the pressure in passage 556 increases beyond a predetermined value, however, the pressure in passage 540 is augmented so that the resultant pressure is of greater magnitude than the pressure in passage 556.

As will be explained subsequently, the magnitude of the pressure in passage 556 is an indicator of the engine manifold pressure for the vehicle engine. Since the torque demand under driving conditions is not reflected accurately by changes in engine manifold pressure, it is necessary to augment the pressure 556 in the manner described so that the pressure in passage 540 will be a general or approximate indicator of the engine torque demand. The secondary throttle pressure in passage 556 is obtained by a secondary throttle valve which comprises a valve element 558 having spaced lands 560 and 562. These lands define a differential area since land 562 is of greater diameter than the diameter of valve land 560.

Valve element 558 is situated within a valve chamber 564. Valve element 558 is biased in a right hand direction as viewed in FIGURE 2 by a valve spring 566.

Passage 556 communicates directly with passage 358 and with branch passages 568, the latter communicating with the secondary valve chamber in the region of spring 566 and with the differential area defined by valve lands 562 and 560.

Primary throttle valve pressure is distributed to the right-hand end of valve chamber 564 through primary throttle valve pressure passage 570. The pressure in passage 570 thus is reduced in magnitude by an amount that is determined by the calibration of spring 566. The reduced primary throttle valve pressure then is distributed to passage 568 and made available to passage 556.

Passage 570 communicates with a primary throttle valve which comprises a valve element 572 situated within a valve chamber 574. This valve element 572 comprises spaced valve lands 576 and 580. Line pressure passage 300 communicates with valve chamber 574 adjacent valve land 576. Passage 570 communicates also with the valve chamber 574 at a region intermediate valve lands 576 and 580. This pressure is distributed through a central bore 582 formed in element 572 to the left-hand end of the valve chamber 574. An exhaust port is shown at 584.

A vacuum diaphragm assembly is designated generally by reference character 586. It includes a flexible diaphragm 588 that is connected at its outer periphery to parts 590 and 592 which cooperate to define a cavity 594. Part 592 is in the form of a cup and it cooperates with diaphragm 588 to define a manifold pressure chamber 596. This chamber communicates with the engine intake manifold through a manifold pressure passage 598.

A servo spring 600 is located within the part 592 and acts against the diaphragm to urge the latter in a left-hand direction. The central hub portion of diaphragm 588 is connected to a force transmitting member 602. Disposed between this member 602 and the right-hand side of valve element 572 is a thrust element 604.

Part 590 is connected to an adaptor 606 which is threadably connected to the throttle valve case by means of a threaded connection 608. The manifold pressure force acting upon diaphragm 588 then will be transmitted through members 602 and 604 to the primary throttle valve element 572. When the engine manifold pressure is elevated, the element 572 will tend to shift in a left-hand direction to establish an increased degree of communication between passage 300 and passage 570. Simultaneously, the degree of communication between passage 570 and exhaust port 584 will be progressively decreased. The valve element 572 then will begin to modulate the pressure in passage 300 so that the pressure made available to passage 570 is a function of engine intake manifold pressure.

It will be apparent therefore that the spring force of spring 500 acting upon the 1–2 shift valve element 482 will be supplemented by the force of the modulated throttle valve pressure acting upon the differential area of valve lands 484 and 486. It will be supplemented also by the force of the line pressure acting upon the differential area of valve lands 490 and 492. When these combined forces are overcome by the force of the governor pressure acting upon the 1–2 shift valve element 482, the latter will shift in a downward direction as viewed in FIGURE 2. This immediately will cause a differential area defined by valve lands 490 and 492 to become exhausted through passage 502. The shifting movement of the shift valve can be characterized then as a snap action since the valve element will move quickly to the upshift position. Communication will be interrupted between passage 428 and the exhaust port 430 and communication will be established between passage 478 and passage 428. Passage 494, of course, communicates with the port 430 after the shift valve element assumes the upshift position. Furthermore, the passage 498, although it is exhausted under the conditions we now are describing, will be brought into communication with the differentia area defined by valve lands 486 and 484.

Line pressure then will be distributed from passage 428 to passage 416. The valve 426 immediately will shift to block passage 418 and prevent dumping of line pressure through the exhaust port in the manual valve. Valve element 426 then is flow responsive and it automatically assumes any position that is necessary to prevent flow from a high pressure port to the exhaust region.

Line pressure then passes through the 2–3 back-out valve from passage 416 to the passage 414, and through a flow restricting orifice in passage 414 to the apply side of the intermediate brake servo. This causes the intermediate brake band 142 to become applied, thereby anchoring the common sun gears to condition the gear mechanism for intermediate speed ratio operation. The overrunning coupling shown in part at 250 in FIGURE 1 overruns under these conditions.

The 2–3 shift valve comprises a valve chamber 614 within which is positioned a 2–3 shift valve spool 616. This valve spool includes spaced valve lands 618, 620, 622 and 624. Valve land 620 is slightly smaller in diameter than the diameter of valve land 622. Lands 618 and 620 may be equal in diameter.

Passage 356 communicates through orifice 402 with the valve chamber 614 at a region intermediate valve lands 618 and 620. Passage 404 communicates with this same region as previously indicated. Passage 476 communicates with the valve chamber 614 through a branch passage 626. A flow restricting orifice 628 is situated in passage 476 as indicated.

Passage 476 communicates with the differential area defined by valve lands 620 and 622.

Modulated throttle pressure is distributed to the lower end of the 2–3 shift valve element 616 through a branch passage 630. Each of the shift valves therefore is supplied with a common modulated throttle pressure.

When the magnitude of the governor pressure for any given engine intake manifold pressure reaches a sufficiently high value, the valve element 616 will be shifted in a downward direction as viewed in FIGURE 2. This immediately will cause the differential area defined by valve lands 620 and 622 to become exhausted through the passage 356 and through the communicating exhaust port in the manual valve. Land 622 will block passage 476. At the same time passage 476 will communicate with passage 404 through passage 626 and through the region between lands 618 and 620. Line pressure then will be distributed through the 2–3 shift valve to passage 404. This pressure then will be distributed through the 3–2 coasting control valve to passage 408 which in turn communicates with the release side of the intermediate brake servo.

Passage 404, as previously explained, communicates directly with passage 140 which feeds the direct drive clutch. Thus, since both clutches now are applied and both brakes are released, the transmission mechanism is conditioned for direct drive operation.

The 3–2 coasting control valve comprises a valve chamber 634 within which is positioned a valve element 636. This valve element is formed with two valve lands 638 and 640. It is urged normally in a downward direction by valve spring 642. Passage 404 communicates with the valve chamber 634 at a point intermediate valve lands 638 and 640. When the valve element 636 is in a downward position valve land 638 blocks passage 408 under these conditions.

Governor pressure acts upon the lower end of valve land 640 to urge the valve element 636 in an upward direction against the opposing force of spring 642. Spring 642 is caused to yield when the vehicle speed reaches a predetermined value. When this occurs direct communication is established between passages 404 and 408. When the 3–2 coasting control valve element 636 assumes a downward position, however, the communication between passages 404 and 408 is restricted by reason of the action of orifice 406.

When the vehicle is coasting in the direct drive ratio, the 2–3 shift valve ultimately will assume a downshift position when the governor pressure is insufficient to overcome the opposing forces acting on the valve element 616. Passage 356 then is brought into communication with passage 404 as previously explained. Under these conditions the release side of the intermediate brake servo is exhausted through passage 408, through passage 404 and then through passage 356 which communicates with the exhaust region. At high vehicle speeds, the orifice 406 will be bypassed and the rate of application of the intermediate brake servo will be more rapid than when a corresponding coasting downshift occurs at lower vehicle speeds. The intermediate brake servo then will be applied gently at the lower vehicle speeds and an undesirable harshness in the high speed ratio to intermediate speed ratio downshift is prevented.

In order to cushion the application of the direct drive clutch upon a speed ratio shift from the intermediate speed ratio to the direct drive ratio we have provided a 2–3 back-out valve. This valve comprises a valve chamber 644 within which is situated a 2–3 back-out valve element 646. This valve element is formed with two valve lands 648 and 650 and is urged in an upward direction as viewed in FIGURE 2 by a valve spring 652. The valve spring is seated upon a manual low valve element in the form of a shuttle valve piston 654. This element 654 is situated within the valve chamber 644.

The upper end of valve land 648 is subjected to the pressure in passage 404. Communicating also with the chamber 644 are the passages 416 and 414. When the valve element 646 assumes the position shown, free communication is established between passages 416 and 414. But communication is interrupted between passages 404 and 414.

The lower end of valve land 650 is subjected to primary throttle valve pressure which is distributed to valve chamber 644 through passage 570.

Upon a shift from the intermediate speed ratio to the direct drive ratio the upper end of the valve land 648 is pressurized with the pressure that is made available to the direct drive clutch. After the 2–3 shift valve has moved to an upshift position the pressure initially increases in passage 404 and in the communicating intermediate servo release chamber. At a predetermined increase in the magnitude of this pressure the valve element 646 will move in a downward direction as viewed in FIGURE 2 against the opposing force of the spring 652 and the opposing pressure force of the primary throttle valve pressure in passage 570. As soon as this stroking action occurs, passage 404 is brought into communication with passage 414. Thus the front servo apply pressure, which is equal to line pressure at this time, is connected to the clutch servo feed passage 140 and the servo release line 408. The intermediate servo piston then will begin to accumulate and move to an off position. The upshift then will occur at the low servo end point. That is, the clutch will become applied and the brake will become released at a lower pressure level than would otherwise be experienced without the action of the 2–3 back-out valve.

If the primary throttle valve pressure is increased in magnitude, the end point at which the upshift will occur will become greater. This makes certain that the transmission servo mechanisms will have sufficient pressure to maintain the torque transmitting capacity and prevent an undesirable interruption of the torque delivery path under driving conditions.

Under increased primary throttle pressure the intermediate servo will be stroked to the off position before the 2–3 back-out valve is shifted. The 2–3 back-out valve then is sensitive to any driving requirement to establish the optimum degree of timing between the release of the intermediate servo and the application of the direct drive clutch.

The manual low valve is pressurized by pressure that is distributed to the lower end of valve element 656 by a passage 457. This passage 457 communicates with passage 400 through a downshift valve. Passage 400 in turn is pressurized when the manual valve is shifted to the L position. Under these conditions valve land 390 uncovers passage 398 and establishes communication between passage 398 and the annulus with which passage 400 communicates. Thus when the transmission is shifted to the manual low range driving position the 2–3 back-out valve is returned to the position shown in FIGURE 2. On a manual low 3–2 coast shift, a slight reduction in the direct drive clutch pressure will cause the 3–2 back-out valve to stroke and allow line pressure to energize the intermediate servo apply chamber. If the manual low valve were not employed in this fashion, the intermediate servo apply chamber would not be pressurized with line pressure until the closed throttle end point, as determined by the calibration of the 2–3 back-out valve, would be reached. This would result in an objectionable time delay for the shift.

Upon movement of the manual valve to the L position, the pressure that then is made available to passage 400 is distributed also to the lower end of the 2–3 shift valve element 616 to urge the latter in an upward direction. The 1–2 shift valve element 482 also is urged in an upward direction by reason of the fact that line pressure will be caused to act upon the differential area defined by valve lands 486 and 484. Passage 400 will be brought into fluid communication with passage 432 and the pressure in the latter will act upon the lower end of the 1–2 shift valve spool by reason of the direct communication between passage 432 and the spring chamber that is provided by passage 502. Thus the rear servo will become applied simultaneously with the application of the forward drive clutch while the intermediate servo and the direct drive clutch are exhausted. The intermediate servo is exhausted through passages 414, 416 and 428, the latter communicating with the exhaust port 430 in the 1–2 shift valve chamber. The direct drive clutch is exhausted through the 2–3 shift valve and through passage 356 which in turn communicates with the exhaust port in the manual valve. The transmission will operate in a low speed range and will not upshift in the usual fashion. The low speed brake 216 will be capable of accommodating torque reaction in either direction so that hill braking can be obtained.

A forced downshift valve is situated in communication with passages 300 and passages 456. It includes a valve element 660 situated within a valve chamber 662. Valve element 660 includes valve lands 664 and 666. It is urged in a left-hand direction by a kickdown valve spring 668. The action of the spring 668 is supplemented by the pressure force of the secondary throttle pressure which is distributed to the right-hand end of the valve chamber 662 through spring retainer plate 670.

The downshift valve normally will assume the position shown in FIGURE 2 during movement of the engine carburetor throttle valve throughout a range of positions less than the wide open throttle position. If it assumes a wide open position, however, the engine carburetor throttle linkage will cause the valve element 660 to shift in a right-hand direction. When this occurs line pressure is distributed from passage 300 to passage 457 and also to passage 498. Thus the manual low valve will be pressurized as before and also each of the shift valves will be shifted to the downshift position to force a downshift. When the downshift valve is moved against its spring in this fashion, the transmission will be conditioned for maximum acceleration for the prevailing road conditions.

The primary throttle valve is calibrated to satisfy the requirements of the 2–3 back-out valve. These requirements are not necessarily compatible with the requirements of the shift valve or the requirements of the pressure regulator valve. To satisfy the requirements of the pressure regulator valve, the secondary throttle valve is designed to produce an output pressure that will meet the requirements of the main regulator valve. Its output pressure is established in the manner previously described. It is distributed through passage 358 to the lower end of the main regulator valve spool. As engine manifold pressure increases, the magnitude of the pressure maintained by the main regulator valve is increased accordingly. The necessary capacity for the clutch and brake servos thus is maintained.

To satisfy the requirements of the 2–3 shift valve the output pressure of the secondary throttle valve again is modified by the throttle booster valve in the manner previously described. The 2–3 shift valve and the 1–2 shift valve then sense the approximate degree of torque demand as distinguished from the actual engine output torque measured by the manifold pressure.

In addition to the line pressure modification provided by the secondary throttle valve pressure, it is necessary also to provide a cutback in line pressure as the vehicle speed increases. This is due to the fact that the torque converter mechanism operates at a reduced torque ratio as the vehicle speed increases. The servo system must be designed, however, to maintain clutch and brake capacity at the stall speed of the converter when the torque ratio is a maximum. As the vehicle speed increases, the maximum calibration is not desired since the torque ratio itself is decreased. In order to provide the necessary cutback we have provided a cutback valve which includes a valve element 672 having a pair of spaced valve lands 674 and 676. This valve element 672 is situated within a valve chamber 678.

Communicating with the valve chamber 678 is a line pressure passage 680 which in turn communicates directly with the previously described passages 554 and 300. A cutback pressure passage 682 also communicates with the valve chamber 678 at a point adjacent passage 680. Passage 682 communicates with an exhaust port 684 when the valve element 672 assumes the position shown.

Governor pressure from passage 504 acts upon the lower end of the valve land 676 and the pressure force established thereby is opposed by the force of a valve spring 686.

At lower vehicle speeds passage 682 will be exhausted. At higher vehicle speeds, however, the governor pressure will shift valve element 672 upwardly, thereby establishing communication between passages 680 and 682 and interrupting communication between passage 682 and exhaust port 684. When a shift takes place pressure is distributed to the upper end of the line reducer valve element 688. This valve element is disposed within a valve chamber 690 and is urged in an upward direction by a line reducer valve spring 692.

A line reducer pressure passage 694 communicates with the upper end of the main regulator valve land 312. It communicates also with the lower end of the valve chamber 690 which in turn communicates with an exhaust port 696.

The line reducer valve then is effective to reduce the magnitude of the pressure that would be made available to passage 694. The amount of the reduction is dependent upon the calibration of spring 692. This can be tailored to satisfy the calibration of the main regulator valve itself.

If we now assume that the manual valve is moved to the D2 position, land 392 will uncover passage 396 and land 394 will seal the left-hand end of the manual valve chamber. Line pressure then will be distributed from passage 396 directly to passage 418. The ball valve element 426 will assume the position shown in FIGURE 2. Pressure then will be distributed directly from passage 418 through the valve chamber 424 to the passage 416. The pressure then passes from passage 416 through the 2–3 back-out valve to passage 414 which causes the intermediate brake servo to become applied. Since the sun gears then become anchored, the transmission will not be capable of shifting to the low speed position. The transmission then will begin its acceleration cycle from the intermediate speed ratio range and only a single upshift can be obtained.

Figure 5:
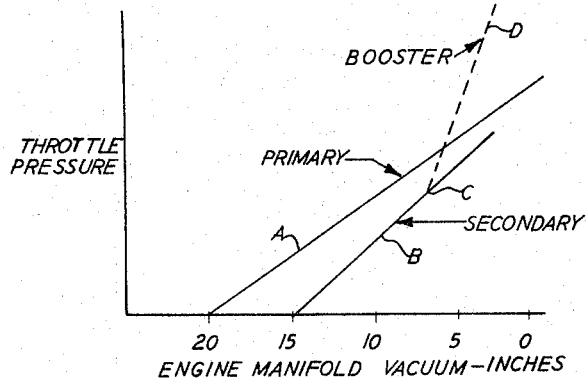
FIGURE 5 is a chart showing the manifold pressure characteristic of the system of FIGURE 2.

In FIGURE 5 is illustrated graphically the variation in throttle pressure with the changes in engine manifold vacuum. The primary throttle valve pressure will vary as indicated by the line A. Typical values of engine manifold vacuum are represented along the abscissa. The secondary throttle valve pressure is of a reduced order of magnitude in comparison to the primary throttle valve pressure. This is due to the action of the secondary throttle valve. The magnitude of this secondary throttle pressure will increase along a line B until it reaches point C. At this time the booster valve element will become shifted so that the effective output pressure of the throttle booster valve will be augmented before it is distributed to the shift valve. The augmented booster valve pressure is indicated by the dotted line D.

Figure 4:
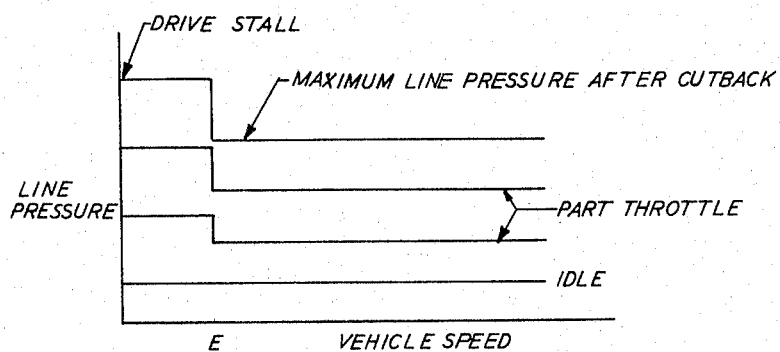
FIGURE 4 is a chart showing the speed-pressure characteristic of the control system of FIGURE 2.

In FIGURE 4 we have illustrated graphically the variation in the line pressure which is obtained by reason of the action of the cutback valve and the line reducer valve. At a predetermined vehicle speed, the cutback is caused to move against the opposing force of its valve spring. This speed is indicated in FIGURE 4 by the symbol E. The maximum degree of cutback is obtained under wide open throttle conditions. Under part throttle operating conditions the degree of cutback is reduced and under idle conditions there is no cutback at all. For this reason the variation in line pressure with changing vehicle speed under engine idling conditions is represented by a straight line.

Figure 6:
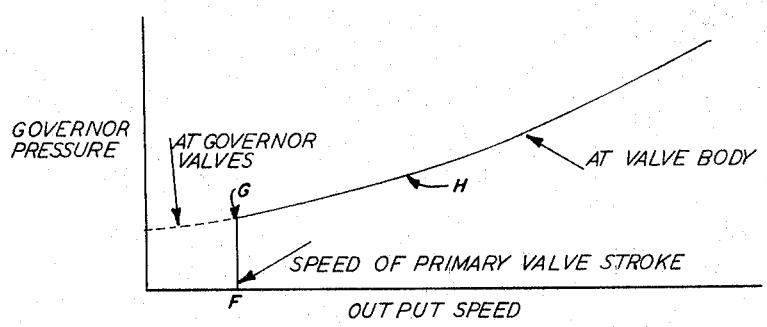
FIGURE 6 is a chart showing the speed characteristic of the governor of FIGURE 2.

In FIGURE 6 we have illustrated graphically the variation in governor pressure with changing vehicle speed. The governor pressure that is made available to passage 504 is of a zero magnitude until the vehicle speed reaches a value indicated by the symbol F. At that time the primary governor shifts in a radially outwardly direction with a snap action. The modulated pressure in passage 518 then immediately is made available to passage 504 and the governor pressure increases in magnitude to a value represented by the symbol G. Further increases in speed then will cause a variation in the governor pressure in passage 504, as indicated by the governor pressure curve H.

In the control circuit the shift from the low speed ratio to the high speed ratio will occur following movement of the primary governor valve element to a radially outward position. The throttle modulator valve modulates throttle pressure to prevent a 2–3 shift delay and a 1–2 shift delay until a specific throttle pressure is obtained.

Governor pressure also controls the action of the 3–2 coasting control valve as explained previously. The 3–2 coasting control valve prevents an undesirable tie-up between the intermediate servo and the direct drive clutch. It would delay the application of the intermediate servo until the drive clutch has been released on a closed throttle 3–2 downshift in the D2 drive range only.

When the 2–3 shift valve is actuated to initiate a 3–2 coasting downshift, pressure drops in both the direct drive clutch and the release side of the intermediate servo. At a certain point the 2–3 backout valve spring will stroke the valve. At this time the apply side of the intermediate servo becomes pressurized with line pressure and the servo piston strokes quickly to a release position.

This forces release oil into the clutch feed line through the 3–2 coasting control valve orifice 406. If it were not for the function of this orifice, a pressure would be maintained in the clutch under these conditions that would be sufficient to maintain the clutch applied. This is due to the low engine torque the prevails during coasting operation. The intermediate brake band then would apply before the clutch would become disengaged, and a tie-up condition would result.

Referring next to FIGURE 3, we have illustrated a single range version of a control system capable of being used with the transmission mechanism of FIGURE 1. For the purpose of simplicity, corresponding elements of the system of FIGURE 2 have been designated in FIGURE 3 by similar reference characters, although primed notations have been added. In this system there is no need for a 3–2 coasting control valve since there is no 3–2 coast downshift. When the manual valve assumes the drive position D, a 1–2 upshift and a 2–3 upshift can be obtained. In this respect the FIGURE 3 circuit operates in a manner similar to the operation of the circuit of FIGURE 2 when the manual valve of FIGURE 2 assumes a D1 position.

Upon a closed throttle downshift the circuit of FIGURE 3 will permit the transmission to shift directly from the high speed direct drive ratio to the low speed ratio. Since no timing problem is involved due to the action of the one-way coupling, there is no need for the 3–2 coasting control valve.

Also there is no need for providing a ball check valve element of the type shown at 426 in FIGURE 2.

It will be observed that the spacing of the valve lands for the manual valve of FIGURE 2 is different than the corresponding spacing of the manual valve of FIGURE 3. The action of the manual valve of FIGURE 3, however, is the same as the action of the manual valve of FIGURE 1 when we eliminate the drive range D2 from consideration.

Having thus described preferred embodiments of our invention, what we claim and desire to secure by U.S. Letters Patent is:

1. In a power transmission mechanism a hydrokinetic unit comprising a bladed turbine and a bladed impeller disposed in toroidal fluid flow relationship, a power input member connected to said impeller, a planetary gear unit comprising two simple planetary gear sets, each set comprising a sun gear, a ring gear, planet gears engageable with said sun and ring gears and a carrier rotatably supporting said planet gears, the sun gears of each set being connected together, a driven member, the carrier of the first gear set being connected to said driven member, the ring gear of the second gear set being connected to said driven member, means for inhibiting rotation of the carrier of the second gear set against rotation in one direction thereby accommodating driving torque reaction during operation of said gear unit in the lowest speed ratio, brake means for selectively braking the common sun gears of said gear sets during operation of said gear unit in an intermediate speed ratio, first clutch means for connecting selectively said turbine to the ring gear of said first gear set, second clutch means engageable simultaneously with said first clutch means to establish a direct drive ratio in said gear unit, a fluid pressure source, fluid pressure operated servos for actuating each clutch means and said brake means, conduit structure including fluid pressure distributor valve means for selectively distributing pressure from said source to said servos, a source of a first fluid pressure signal that is proportional approximately in magnitude to driving torque, a second pressure signal that is proportional substantially in magnitude to the driven speed of said driven member, said distributor valve means being sensitive to each signal to control distribution of pressure selectively to said servos, and valve means disposed in and partly defining said conduit structure for modifying the effective pressure made available by said source to said second clutch means and said brake means in response to variations in said first signal during a speed ratio change from an intermediate speed ratio to a direct drive ratio, said last-named valve means being in fluid communication with said first fluid pressure signal source and with the servo for said second clutch means and being responsive to a pressure build-up in said last-named servo to effect such modification when said first pressure signal is reduced.

2. A power transmission mechanism comprising a hydrokinetic unit having an impeller and a turbine disposed in toroidal fluid flow relationship, a driving member connected to said impeller, a gear unit having a power input member, a driven member and a reaction member, first clutch means for connecting said power input member to said turbine, second clutch means for connecting a second power input member to said turbine, brake means for anchoring selectively said second power input member in sequence with the application of said second clutch means whereby speed ratio changes from an underdrive ratio to a direct drive ratio can be accomplished, a fluid pressure source, fluid pressure operated servos for actuating said clutch means and said brake means, conduit structure connecting said pressure source with each servo, fluid pressure distributor valve means disposed in and partly defining said conduit structure for distributing pressure selectively from said source to said servos, means for actuating said distributor valve means in response to variations in operating variables to effect automatic speed ratio changes between said underdrive ratio and said direct drive ratio, and valve means situated in and partly defining said conduit structure for modifying the magnitude of the pressure made available to said servos by said pressure source in response to variations in the magnitude of one of said operating variables during a speed ratio change whereby the rate of application of one servo and the accompanying rate of disengagement of the other servo are controlled in timed relationship, said last-named valve means being in fluid communication with said one servo and adapted to respond to changes in said one operating variable, said last-named valve means being responsive to a pressure build-up in said one servo when said one operating variable is reduced thereby controlling such servo engagement.

3. A power transmission mechanism comprising a power input member, a power output member, a gear unit interconnecting said power input member and said power output member and establishing plural torque delivery paths therebetween, said power input member being connected to one member of said gear unit, clutch means for connecting together for rotation in unison another member of said gear unit and said power input member, brake means for anchoring one member of said gear unit in sequence with the application and release of said clutch means to establish an underdrive ratio in said gear unit, a first fluid pressure operated servo for applying said clutch means, a second fluid pressure operated servo for applying said brake means, said second fluid pressure operated servo comprising a brake applying piston and a cooperating cylinder having pressure chambers on either side of said piston, said first servo being connected hydraulically to the release chamber of said second servo, a fluid pressure source, conduit structure interconnecting said pressure source and said servos including a portion extending to said first servo and the release chamber of said second servo, distributor valve means disposed in and partly defining said conduit structure portion for establishing and interrupting distribution of pressure selectively to said servos, a first pressure signal source adapted to supply a pressure signal proportional magnitude to a first operating variable, a second pressure source adapted to supply a pressure signal proportional magnitude to a second operating variable, said pressure signals acting upon and controlling the response of said pressure distributor valve means, and a shift timing valve means disposed in fluid communication with said first servo and the apply chamber of said second servo for establishing a by-pass flow between said first servo and the apply chamber of said second servo upon a pressure increase in said first servo.

4. A power transmission mechanism comprising a power input member, a power output member, a gear unit interconnecting said power input member and said power output member and establishing plural torque delivery paths therebetween, said power input member being connected to one member of said gear unit clutch means for connecting together for rotation in unison another member of said gear unit and said power input member in sequence with the application and release of said clutch means to establish underdrive ratio in said gear unit, a first fluid pressure operated servo for applying said clutch means, a second fluid pressure operated servo for applying brake means, said second fluid pressure operated servo comprising a brake applying piston and a cooperating cylinder having pressure chambers on either side of said piston, said first servo being connected hydraulically to the release chamber of said second servo, a fluid pressure source, conduit structure interconnecting said pressure source and said servos including a portion extending to said first servo and the release chamber of said second servo, distributor valve means disposed in and partly defining said conduit structure portion for controlling distribution of pressure to said servos, a first pressure signal source adapted to supply a pressure signal proportional magnitude to a first operating variable, a second pressure source adapted to supply a pressure signal proportional magnitude to a second operating variable, said pressure signals acting upon and controlling the response of said pressure distributor valve means, and a shift timing valve means disposed in fluid communication with said first servo and the apply chamber of said second servo for establishing a by-pass flow between said first servo and the apply chamber of said second servo upon a pressure increase in said first servo, said timing valve means being responsive to variations in the magnitude in said first pressure signal whereby the pressure build-up in said first servo at which said by-pass action occurs is dependent upon the magnitude of said first pressure signal.

5. A power transmission mechanism comprising a power input member, a power output member, a gear unit interconnecting said power input member and said power output member and establishing plural torque delivery paths therebetween, said power input member being connected to one member of said gear unit, clutch means for connecting together for rotation in unison another member of said gear unit and said power input member, brake means for anchoring one member of said gear unit in sequence with the application and release of said clutch means to establish an underdrive ratio in said gear unit, a first fluid pressure operated servo for applying said clutch means, a second fluid pressure operated servo for applying said brake means, said second fluid pressure operated servo comprising a brake applying piston and a cooperating cylinder having pressure chambers on either side of said piston, said first servo being connected hydraulically to the release chamber of said second servo, a fluid pressure source, conduit structure interconnecting said pressure source and said servos including a portion extending to said first servo and the release chamber of said second servo, distributor valve means disposed in and partly defining said conduit structure portion for controlling distribution of pressure to said servos, a first pressure signal source adapted to supply a pressure signal proportional magnitude to a first operating variable, a second pressure source adapted to supply a pressure signal proportional magnitude to a second operating variable, said pressure signals acting upon and controlling the response of said pressure distributor valve means, a shift timing valve means disposed in fluid communication with said first servo and the apply chamber of said second servo for establishing a by-pass flow between said first servo and the apply chamber of said second servo upon a pressure increase in said first servo, said timing valve means being responsive to variations in the magnitude of said first pressure signal whereby the pressure build-up in said first servo at which said by-pass action occurs is dependent upon the magnitude of said first pressure signal, and manual valve means connected hydraulically to said fluid pressure source for overruling the action of said distributor valve means and the action of said timing valve means including branch passage portions extending to said timing valve means and said pressure distributor valve means, said branch passage means being defined in part by said manual valve means.

6. A power transmission mechanism comprising a power input member, a power output member, a gear unit adapted to establish plural torque delivery paths between said power input member and said power output member, said gear unit comprising a first power input element connected to said power input member, a second power input element, and a driven element, clutch means for connecting selectively said second power input element to said power input member, first brake means for anchoring a first reaction element of said gear unit, second brake means for anchoring selectively said second power input element in sequence for the application and release of said clutch means to establish an intermediate driving speed ratio, said gear unit establishing a low speed driving ratio when said clutch means is disengaged and said first brake means is applied, said gear unit assuming a direct drive ratio when both brake means are released and said clutch is applied, a fluid pressure source, a fluid pressure operated clutch servo for operating said clutch, a fluid pressure operated brake servo for operating said second brake means including a brake apply chamber and a brake release chamber, conduit structure interconnecting said pressure source and said servos including three separate portions, a first portion extending to said clutch servo, a second portion extending to said apply chamber of said brake servo and a third portion extending to the release chamber of said brake servo, a first fluid pressure distributor valve means disposed in said first and third portions for controlling pressure distribution therethrough, a second fluid pressure distributor valve means disposed in said second portion for controlling pressure distribution to said apply chamber, a source of an engine torque sensitive pressure signal, a source of a pressure signal that is proportional magnitude to the driven speed of said driven member, each pressure distributor valve being subjected to said pressure signals and actuated thereby, and valve means connected hydraulically to said clutch servo and responsive to a pressure build-up therein for modifying the rate of the pressure build-up in said clutch servo and in the release chamber of said brake servo during a speed ratio change from an intermediate speed ratio to a direct drive ratio, said last-named valve means having a signal area thereon in fluid communication with said torque sensitive signal source whereby the torque sensitive signal opposes the influence of clutch servo pressure acting thereon, the degree of modification being dependent upon the magnitude of said torque sensitive signal.

7. A power transmission mechanism comprising a power input member, a power output member, a gear unit adapted to establish plural torque delivery paths between said power input member and said power output member, said gear unit comprising a first power input element connected to said power input member, a second power input element, a driven element, clutch means for connecting selectively said second power input element to said power input member, first brake means for anchoring a first reaction element of said gear unit, second brake means for anchoring selectively said second power input element in sequence for the application and release of said clutch means to establish an intermediate driving speed ratio, said gear unit establishing a low speed driving ratio when said clutch means is disengaged and said first brake means is applied, said gear unit assuming a direct drive ratio when both brake means are released and said clutch is applied, a fluid pressure source, a fluid pressure operated clutch servo for operating said clutch, a fluid pressure operated brake servo for operating said second brake means including a brake apply chamber and a brake release chamber, conduit structure interconnecting said pressure source and said servos including three separate portions, one portion extending to said clutch servo, a second portion extending to the apply chamber of said brake servo and a third portion extending to the release chamber of said brake servo, a first fluid pressure distributor valve means disposed in said first and third portions for controlling pressure distribution therethrough, a second fluid pressure distributor valve means disposed in said second portion for controlling pressure distribution to said apply chamber, a source of an engine torque sensitive pressure signal, a source of a pressure signal that is proportional in magnitude to the driven speed of said driven member, each pressure distributor valve being subjected to said pressure signals and actuated thereby, valve means connected hydraulically to said clutch servo and responsive to a pressure build-up therein for modifying the rate of the pressure build-up in said first servo and on the release side of said second servo during a speed ratio change from the intermediate speed ratio to the direct drive ratio, said last-named valve means having a signal area thereon in fluid communication with said torque sensitive signal source whereby the torque sensitive signal opposes the influence of clutch servo pressure acting thereon, the degree of modification being dependent upon the magnitude of said torque sensitive signal, and manual valve means for overruling the action of each distributor valve means including a manually controlled valve element disposed in fluid communication with said conduit structure, said manual valve being adapted to distribute overruling pressure to one fluid pressure distributor valve means when it assumes one position, said manual valve being adapted also to distribute an overruling pressure to each distributor valve means and to said pressure modifying valve means when it assumes a second operating position.

8. A power transmission mechanism comprising a power input member, a power output member, a gear unit adapted to establish plural torque delivery paths between said power input member and said power output member, said gear unit comprising a first power input element connected to said power input member, a second power input element, and a driven element, clutch means for connecting selectively said second power input element to said power input member, first brake means for anchoring a first reaction element of said gear unit, second brake means for anchoring selectively said second power input element in sequence for the application and release of said clutch means to establish an intermediate driving speed ratio, said gear unit establishing a low speed driving ratio when said clutch means is disengaged and said first brake means is applied, said gear unit assuming a direct drive ratio when both brake means are released and when said clutch is applied, a fluid pressure source, a fluid pressure operated clutch servo for operating said clutch, a fluid pressure operated brake servo for operating said second brake means including a brake apply chamber and a brake release chamber, conduit structure interconnecting said pressure source and said servos including three separate portions, one portion extending to said clutch servo, a second portion extending to the apply chamber of said brake servo and a third portion extending to the release chamber of said brake servo, a first fluid pressure distributor valve means disposed in said first and third portions for controlling pressure distribution therethrough, a second fluid pressure distributor valve means disposed in said second portion for controlling pressure distribution to said apply chamber, a source of an engine torque sensitive pressure signal, a source of a pressure signal that is proportional in magnitude to the driven speed of said driven member, each pressure distributor valve being subjected to said pressure signals and actuated thereby, valve means connected hydraulically to said clutch servo and responsive to a pressure build-up therein for modifying the rate of the pressure build-up in said first servo and the release side of said second servo during a speed ratio change from the intermediate speed ratio to the direct drive ratio, said last-named valve means having a signal area thereon in fluid communication with said torque sensitive signal source whereby the torque sensitive signal opposes the influence of clutch servo pressure acting thereon, the degree of modification being dependent upon the magnitude of said torque sensitive signal, manual valve means for overruling selectively the action of each distributor valve means including a manually controlled valve element disposed in fluid communication with said conduit structure, said manual valve comprising a valve spool, a manual valve chamber slidably receiving said valve spool, separate portions of said conduit structure communicating with said valve chamber, a plurality of lands formed on said valve spool including a first set of valve lands situated on one side of said valve spool for cooperating with a first series of said conduit structure portions and a second set of valve lands disposed on said valve spool 180° out of position with respect to said first valve lands for controlling distribution of pressure through a second set of said conduit structure portions.

9. In a control system for an automatic power transmission mechanism, fluid pressure operated servos, a fluid pressure source, conduit structure interconnecting said servos and said pressure source, means for establishing a first pressure signal proportional in magnitude to a first operating variable, means for establishing a second pressure signal proportional in magnitude to a second operating variable, a pressure regulator valve means for regulating the magnitude of the pressure made available by said pressure source, a fluid pressure area on said regulator valve, a pressure passage communicating with said pressure area, a cut-back valve establishing controlled communication between said passage and a high pressure region of said circuit, said cut-back valve being sensitive to variations in the magnitude of one operating variable to establish and interrupt selectively communication between said passage and said high pressure region whereby the regulating characteristics of said pressure regulator valve are altered when the magnitude of said one operating variable is within a predetermined range of values, said cut-back valve comprising a valve element having two operating positions with respect to said passage, said valve element blocking pressure distribution through said passage when it assumes one position and providing pressure distribution therethrough when it assumes its other position, the operating pressure level maintained by said regulator valve being altered substantially instantaneously upon movement of said valve element from one position to another.

10. In a power transmission mechanism, a driving member, a driven member, gear elements drivably connecting said driving and driven elements and defining plural torque delivery paths therebetween, fluid pressure operated servos for controlling the relative motion of the elements of said gear unit, a fluid pressure source, main regulator valve means for regulating the magnitude of the output pressure of said source, conduit structure interconnecting said main regulator valve means and said servos, fluid pressure distributor valve means disposed in and partly defining said conduit structure for selectively controlling the distribution of pressure to each servo, a source of pressure that is sensitive to the speed of said driven member, a source of pressure that is sensitive to the magnitude of the power input torque, a hydraulic connection between said torque sensitive pressure source and said main regulator valve means for modifying the magnitude of the pressure made available to said servos in accordance with changes in the input torque, a fluid pressure area on said main regulator valve, passage means communicating with said fluid pressure area, and cut-back valve means establishing and interrupting alternately communication between said passage means and a high pressure region of said circuit, said cut-back valve means being in fluid communication with said speed sensitive pressure source and actuated by said speed sensitive pressure when the magnitude of the latter is within a predetermined operating range whereby pressure distribution to said pressure area is controlled to establish a lower regulated pressure during operation of said mechanism at high driven speeds.

11. In a power transmission mechanism, a driving member, a driven member, gear elements drivably connecting said driving and driven elements and defining plural torque delivery paths therebetween, fluid pressure operated servos for controlling the relative motion of the elements of said gear unit, a fluid pressure source, main regulator valve means for regulating the magnitude of the output pressure of said source, conduit structure interconnecting said main regulator valve means and said servos, fluid pressure distributor valve means disposed in and partly defining said conduit structure for selectively controlling the distribution of pressure to each servo, a source of pressure that is sensitive to the speed of said driven member, a source of pressure that is sensitive to the magnitude of the power input torque, a hydraulic connection between said torque sensitive pressure source and said main regulator valve means for modifying the magnitude of the pressure made available to said servos in accordance with changes in the input torque, a fluid pressure area on said main regulator valve, passage means communicating with said fluid pressure area, and cut-back valve means establishing and interrupting alternately communication between said passage means and a high pressure region of said circuit, said cut-back valve means being in fluid communication with said speed sensitive pressure source and actuated by said speed sensitive pressure when the magnitude of the latter is within a predetermined operating range whereby pressure distribution to said pressure area is controlled to establish a lower regulated pressure during operation of said mechanism at high driven speeds, the fluid connection between said torque sensitive pressure source and said main regulator valve means comprising a secondary throttle valve means for changing the magnitude of the effective pressure made available to said main regulator valve to a desired level.

12. In a drive line for a vehicle having an engine with an air intake manifold, a multiple speed ratio power transmission mechanism comprising gear motion controlling servos, a fluid pressure source, regulator valve means for regulating the pressure supplied by said source at a desired operating level, conduit structure extending from said source to said servos, first valve means for establishing a first pressure signal proportional in magnitude to engine manifold pressure, shift valve means disposed in and partly defining said conduit structure for distributing selectively fluid pressure to said servos to accomplish speed ratio changes, valve means communicating with one servo and sensitive to a pressure build-up therein for modifying the rate of pressure build-up in a portion of said conduit structure communicating with both of said servos during a speed ratio shift interval when the magnitude of the pressure build-up in said one servo reaches a predetermined design limit less than its ultimate servo pressure, said rate modifying valve means being connected hydraulically to said first valve means and responding to changes in said pressure signal to vary said limit whereby an optimum degree of timing in the operation of said servos is achieved.

13. In a drive line for a vehicle having an engine with an air intake manifold, a multiple speed ratio power transmission mechanism comprising gear motion controlling servos, a fluid pressure source, regulator valve means for regulating the pressure supplied by said source at a desired operating level, conduit structure extending from said source to said servos, first valve means for establishing a first pressure signal proportional in magnitude to engine manifold pressure, shift valve means disposed in and partly defining conduit structure for distributing selectively fluid pressure to said servos to accomplish speed ratio changes, valve means communicating with one servo and sensitive to a pressure build-up therein for modifying the rate of pressure build-up in a portion of said conduit structure communicating with both of said servos during a speed ratio shift interval when the magnitude of the pressure build-up in said one servo reaches a predetermined design limit less than its ultimate servo pressure, said rate modifying valve means being connected hydraulically to said first valve means responding to changes in said pressure signal to vary said limit whereby an optimum degree of timing in the operation of said servos is achieved, a source of a second pressure signal proportional in magnitude to the driven speed of a driven member of said transmission mechanism, and means for subjecting said shift valve means to said first and second pressure signals to actuate the same.

14. In a drive line for a vehicle having an engine with a carburetor controlled air intake manifold, a multiple speed ratio power transmission mechanism comprising gear motion controlling servos, a fluid pressure source, regulator valve means for regulating the pressure supplied by said source at a desired operating level, conduit structure extending from said source to said servos, first valve means for establishing a first pressure signal proportional in magnitude to engine manifold pressure, shift valve means disposed in and partly defining conduit structure for distributing selectively fluid pressure to said servos to accomplish speed ratio changes, valve means for modifying the rate of pressure build-up in a portion of said conduit structure communicating with two of said servos during a speed ratio shift interval when the magnitude of the pressure build-up in one servo reaches a predetermined design limit less than the ultimate servo pressure, said rate modifying valve means responding to changes in said pressure signal to vary said limit whereby an optimum degree of timing in the operation of said servo is achieved, a source of a second pressure signal proportional in magnitude to the driven speed of a driven member of said transmission mechanism, a means for subjecting said shift valve means to said first and second pressure signals to actuate the same, and additional valve means disposed in branch portions of the conduit structure communicating with said first pressure signal source for modifying said first pressure signal when the magnitude of said first pressure signal exceeds a calibrated value, said branch portions interconnecting said additional valve means and said shift valve means, the resultant modified signal output of said additional valve means being distributed through said branch portions to said shift valve means whereby the speed range at which said shift valve means responds to changes in said pressure signals is extended for each carburetor opening for the engine intake manifold.

15. A multiple speed ratio power transmission mechanism for use with a throttle controlled engine with an air intake manifold, gear motion controlling servos, a fluid pressure source, means for establishing a first pressure signal that is proportional in magnitude to engine manifold pressure, a main regulator valve means for regulating the magnitude of the pressure made available by said source, conduit structure connecting said servos and said source, fluid pressure distributor valve means situated in and partly defining said conduit structure for distributing selectively fluid pressure to said servos, a source of a pressure signal that is proportional in magnitude to the speed of rotation of a driven member of said mechanism, said speed pressure signal and said first pressure signal acting upon said distributor valve means for controlling the operation of the same, said first pressure signal acting upon said main regulator valve means whereby the magnitude of the regulated pressure level increases upon an increase in the engine manifold pressure for any given speed, means for modifying the first pressure signal that is distributed to said distributor valve means whereby the speed range throughout which speed ratio changes can be accomplished by changes in the magnitude of said signals is extended for any given engine carburetor setting, and cut-back valve means for reducing the magnitude of the pressure made available by said regulator valve means in response to a change in the magnitude of said speed signal to a value greater than a predetermined value comprising a passage means for connecting hydraulically said regulator valve means and said pressure source, a two position valve element disposed in said passage means, said valve element being adapted to establish pressure distribution through said passage when it assumes one position and to block said distribution when it assumes another position, said valve element being connected hydraulically to said speed signal source whereby said speed signal actuates said valve element.

16. A multiple speed ratio power transmission mechanism for use with a throttle controlled engine with an air intake manifold, gear motion controlling servos, a fluid pressure source, means for establishing a first pressure signal that is proportional in magnitude to engine manifold pressure, a main regulator valve means for regulating the magnitude of the pressure made available by said source, conduit structure connecting said servos and said source, fluid pressure distributor valve means situated in and partly defining said conduit structure for distributing selectively line pressure to said servos, a source of a pressure signal that is proportional in magnitude to the speed of rotation of a driven member of said mechanism, said speed pressure signal and said first pressure signal acting upon said distributor valve means for controlling the operation of the same, said first pressure signal acting upon said main regulator valve means whereby the magnitude of the regulated pressure level increases upon an increase in the engine manifold pressure for any given speed, means for modifying the first pressure signal that is distributed to said distributor valve means whereby the speed range throughout which speed ratio changes can be accomplished by changes in the magnitude of said signals is extended for any given engine carburetor setting, a fluid pressure area formed by said main regulator valve means, a line pressure cut-back valve, passage means extending to said area and communicating with said cut-back valve, said cut-back valve communicating also with a high pressure region of said conduit structure, and means for subjecting said cut-back valve to said speed signal whereby a pressure change on said main regulator valve area is experienced upon a change in the magnitude of said speed signal beyond a predetermined value.

17. A power transmission mechanism comprising a power input member, a power output member, a gear unit adapted to establish plural torque delivery paths between said power input member and said power output member, said gear unit comprising a first power input element connected to said power input member, a second power input element, and a driven element, clutch means for connecting selectively said second power input element to said power input member, first brake means for anchoring a first reaction element of said gear unit, second brake means for anchoring selectively said second power input element in sequence for the application and release of said clutch means to establish an intermediate driving speed ratio, said gear unit establishing a low speed driving ratio when said clutch means is disengaged and said first brake means is applied, said gear unit assuming a direct drive ratio when both brake means are released and when said clutch is applied, a fluid pressure source, a fluid pressure operated clutch servo for operating said clutch, a fluid pressure operated brake servo for operating said second brake means including a brake apply chamber and a brake release chamber, conduit structure interconnecting said pressure source and said servos including three separate portions, one portion extending to said clutch servo, a second portion extending to the apply chamber of said brake servo and a third portion extending to the release chamber of said brake servo, a first fluid pressure distributor valve means disposed in said first and third portions for controlling pressure distribution therethrough, a second fluid pressure distributor valve means disposed in said second portion for controlling pressure distribution to said apply chamber, a source of an engine torque sensitive pressure signal, a source of a pressure signal that is proportional in magnitude to the driven speed of said driven member, each pressure distributor valve being subjected to said pressure signals and actuated thereby, manual valve means for overruling selectively the action of each distributor valve means including a manually controlled valve element disposed in fluid communication with said conduit structure, said manual valve comprising a manual valve element, a manual valve chamber slidably receiving said manual valve element, separate portions of said conduit structure communicating with said valve chamber, a plurality of lands formed on said manual valve element including a first set of valve lands situated on one side of said manual valve element for cooperating with a first series of said conduit structure portions and a second set of valve lands disposed on said valve spool 180° out of position with respect to said first valve lands for controlling distribution of pressure through a second set of said conduit structure portions.

References Cited by the Examiner
UNITED STATES PATENTS

| | | |
|---|---|---|
| 2,177,011 | 10/1939 | Whitehead. |
| 2,233,720 | 3/1941 | Velo. |
| 2,722,296 | 11/1955 | Stoeckicht. |
| 2,846,900 | 8/1958 | McFarland et al. |
| 3,000,230 | 9/1961 | Froslie. |
| 3,004,446 | 10/1961 | Flinn. |
| 3,004,447 | 10/1961 | Sand. |
| 3,049,937 | 8/1962 | Lindsay. |
| 3,085,449 | 4/1963 | De Corte et al. |
| 3,095,755 | 7/1963 | Duffy. |
| 3,117,464 | 1/1964 | Ivey. |
| 3,118,320 | 1/1964 | Ivey. |
| 3,142,999 | 8/1964 | Searles et al. |
| 3,158,037 | 11/1964 | Searles. |

DAVID J. WILLIAMOWSKY, *Primary Examiner.*

THOMAS C. PERRY, *Examiner.*